UNITED STATES PATENT OFFICE.

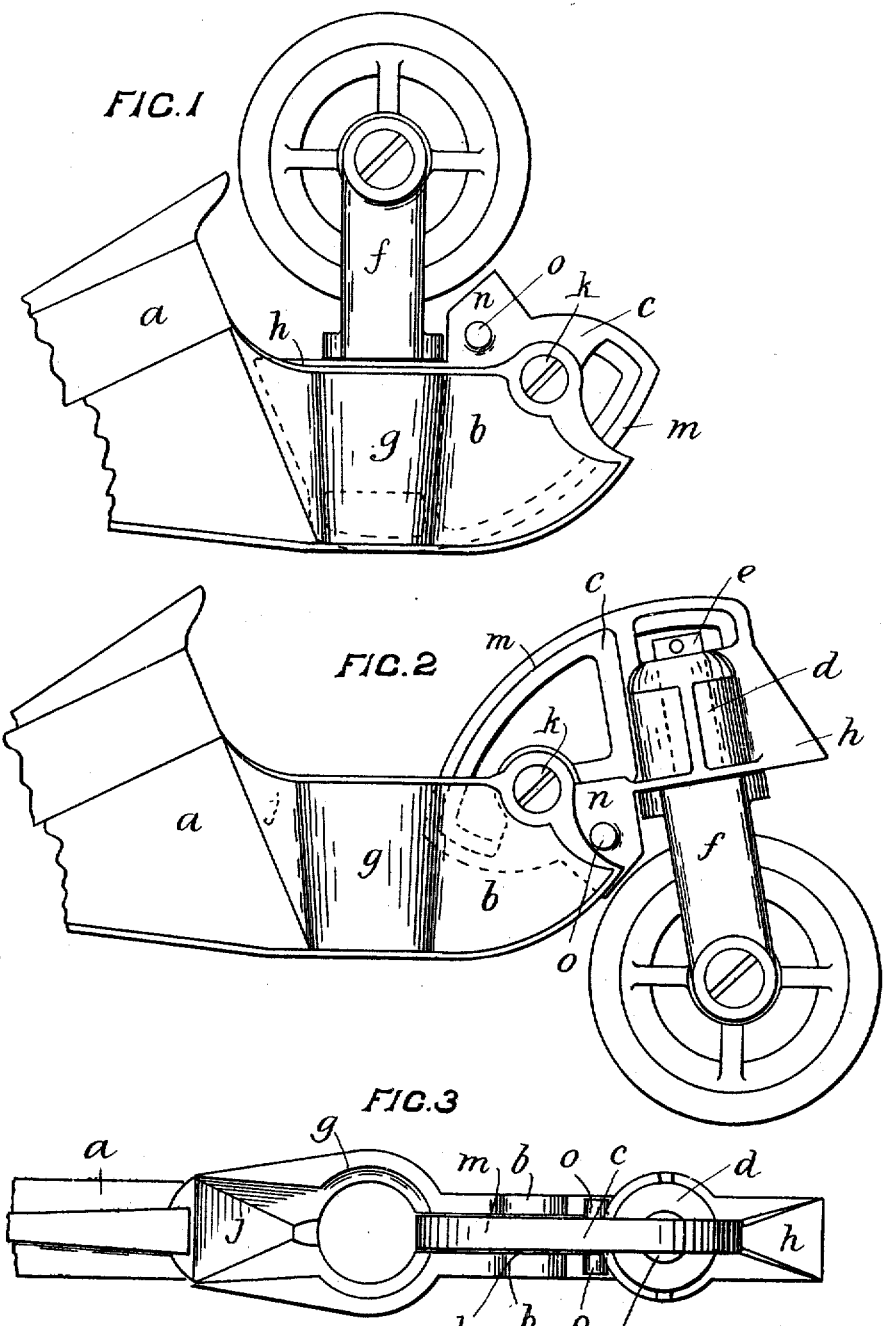

CHARLES SPENCER BAYLEY, OF AUCKLAND, NEW ZEALAND.

TROLLEY-HEAD FOR ELECTRIC CARS.

954,014. Specification of Letters Patent. Patented Apr. 5, 1910.

Application filed December 22, 1908. Serial No. 468,781.

*To all whom it may concern:*

Be it known that I, CHARLES SPENCER BAYLEY, subject of the King of Great Britain, residing at Grey Lynn, Auckland, in the Dominion of New Zealand, have invented a new and useful Improved Trolley-Head for Electric Cars; and I do hereby declare the following to be a full, clear, and exact description of the same.

This invention relates to an improved construction of trolley head for electric cars of that type in which the wheel is adapted to fall back when it hits against any of the overhead gear, so that it will lie back and be incapable of entanglement with the overhead gear should the trolley pole leave the conductor wire.

According to this invention, the head is formed with the usual socket piece constructed with a pair of rearwardly extending cheeks. The trolley wheel is mounted in the usual manner in a fork attached to a vertical spindle. This spindle is journaled within a casting or tumbler of peculiar form, that is pivoted between the rear ends of the cheeks of the head in such a manner that under normal conditions, the tumbler will extend forward and lie between such cheeks in order to support the trolley wheel in the proper position for running. Should the wheel be struck from the front by any obstacle, the tumbler will turn back and over, carrying the wheel with it, so that the wheel or fork will be turned right over, and will lie below the level of the pole end.

The tumbler is formed with a wedge shaped end remote from its pivot end. This wedge shaped end is adapted to fit into a corresponding rest made between the forward ends of the cheeks so as to maintain the wheel upright when it is in position. The underside of the tumbler is formed with a curved surface or guard which, when the tumbler is turned back and over, will provide for it sliding freely beneath the overhead wires.

In the accompanying drawings,—Figure 1 is a side elevation of the head in the normal running condition. Fig. 2 is a similar view of the head with the tumbler and wheel in the position assumed when forced back. Fig. 3 is a plan view of the same.

$a$ is the socket piece of the head which is of usual form, and is formed with rearwardly extending cheeks $b$ arranged at the required distance apart to allow of the tumbler being placed between them.

$c$ is the tumbler that is adapted to fit between the cheeks $b$ and which is formed with a bearing block $d$ in which the vertical spindle $e$ that carries the trolley wheel fork $f$, is journaled in the usual manner. The side cheeks $b$ are widened out, as at $g$, to form a tapered recess into which this bearing block will fit. The forward end of the tumbler is provided with a wedge shaped projecting portion $h$ and the corresponding end of the space between the forks $b$ is also formed with a wedge shaped recess $j$ into which the wedge $h$ is adapted to fit. The tumbler $c$ is pivoted at its rear end between the rear ends of the cheeks $b$ by means of a suitable pivot screw or the like $k$. It thus extends forwardly between such cheeks, and by reason of its weight, will lie normally in such position in order to carry the trolley wheel in the proper position for running.

The wedge $h$ fitting within the correspondingly shaped recess $j$ will serve to keep the tumbler firmly in its proper position, and to prevent any looseness in side play. The wheel will thereby be kept rigidly vertical while being free to rotate on its own axis, and the fork $f$ to swivel in the horizontal plane within its bearing block $d$.

Should any obstacle strike the wheel or fork from the front, or should such engage against any overhead cross wires or other gear when running, the tumbler $c$ will be lifted up out of its seat between the cheeks $b$ and turned back and over on its pivot $k$, carrying the fork and trolley wheel with it also. When it moves beyond the forward pull of its gravity, it will fall right back to the position shown in Figs. 2 and 3, so that the whole will be reversed and will lie mainly to the rear of the rear end of the head with the fork and trolley wheel below the level thereof.

The bottom end of the tumbler is formed with a curved guard piece $m$ extending along its length, which, when the tumbler is reversed, will curve upwardly and rearwardly from the level of the cheeks $b$ as shown in Fig. 2. This guard piece will serve to guide the head beneath any overhead fixtures with which it comes in contact when the car travels after the wheel has been thrown back. Consequently, the liability of the head becoming entangled in the overhead gear upon the trolley wheel leaving the conductor wire and the pole flying up, is entirely obviated.

To replace the trolley wheel and tumbler in the proper position for running, it will only be necessary to pull the pole down by the ordinary control rope, and then allow it to swing quickly upward for a slight distance. The impetus of this swing will be sufficient to cause the tumbler to turn up on its pivot pin, and then to fall forward into its normal position.

The tumbler $c$ is preferably formed with a short upward extension $n$ near its back end, which extension is arranged to lie closely beneath the rim of the trolley wheel in order to serve as a guard to prevent any gear catching in such wheel when the car is running backward.

Stops $o$ are arranged to project outward one on each side of the tumbler, which stops engage with the back edge of the cheeks $b$ when the tumbler falls back, and serve to prevent the wheel falling against such cheeks, and of any liability of damage being caused thereby.

What I do claim as my invention, and desire to secure by Letters Patent, is,—

1. A trolley head having a pair of side cheeks extending rearwardly from the head and having a recess within the forward end of the space between the cheeks, a tumbler fitting between said cheeks and having a wedge-shaped projection adapted to fit within the recess aforesaid, said tumbler being pivoted at its rear end to the cheeks, and a bearing block within the tumbler, in combination with a trolley fork provided with a spindle fitting said bearing block.

2. A trolley head having a pair of side cheeks extending rearwardly from the head, a tumbler pivoted at its rear end between said cheeks and having its forward end formed to fit the forward end of the space between the cheeks, and having a curved guard piece along the bottom edge of the tumbler, in combination with a trolley-fork carried by and having a swiveling connection with the tumbler.

In testimony whereof, I have signed this specification in the presence of two subscribing witnesses.

CHARLES SPENCER BAYLEY.

Witnesses:
E. RAWHE-SMITH,
E. F. COURTNEY.